US011784710B2

(12) United States Patent
Ge et al.

(10) Patent No.: US 11,784,710 B2
(45) Date of Patent: Oct. 10, 2023

(54) SATELLITE ORIENTATION SYSTEM

(71) Applicant: The Aerospace Corporation, El Segundo, CA (US)

(72) Inventors: Howard H. Ge, Hacienda Heights, CA (US); Erin Y. Hong, Lawndale, CA (US); Richard Y. Chiang, Torrance, CA (US); Devon Feaster, Torrance, CA (US); Tuong-Vi Thi Tran, Garden Grove, CA (US); Michael Andonian, Los Angeles, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 49 days.

(21) Appl. No.: 17/691,696

(22) Filed: Mar. 10, 2022

(65) Prior Publication Data

US 2023/0291467 A1    Sep. 14, 2023

(51) Int. Cl.
*H04B 7/185* (2006.01)
*H04B 1/10* (2006.01)

(52) U.S. Cl.
CPC ....... *H04B 7/18539* (2013.01); *H04B 1/1018* (2013.01); *H04B 7/18591* (2013.01)

(58) Field of Classification Search
CPC ............. H04B 7/18539; H04B 1/1018; H04B 7/18591; H04B 7/18504; H04B 7/24;
(Continued)

(56) References Cited

U.S. PATENT DOCUMENTS 8,305,265 B2 * 11/2012 Ezal ................. G01S 19/42
                                                  342/417
9,331,774 B2 *  5/2016 Chen ................ H04B 7/18517
(Continued)

FOREIGN PATENT DOCUMENTS

WO    WO-2010096104 A1 *  8/2010 ......... G05B 23/0294

OTHER PUBLICATIONS

Chiang, Richard Y., "Theory and Weighting Strategies of Mixed Sensitivity H Synthesis on a Class of Aerospace Applications", Guidance, Navigation, and Control, Jet Propulsion Lab, Pasadena, CA, 1996.
(Continued)

*Primary Examiner* — Lana N Le
(74) *Attorney, Agent, or Firm* — LeonardPatel PC

(57) ABSTRACT

Embodiments of the present invention include a two-stage blending filter that blends the measurements from two angular sensors to form a single superior high bandwidth measurement for improved disturbance rejection in a satellite systems for increased accuracy in satellite pointing, orientation, and attitude control. Embodiments of the present invention can include a satellite system including a first sensor including or defining a first measurement bandwidth; a first filter connected to the first sensor; a second sensor including or defining a second measurement bandwidth; a second filter connected to the second sensor; and a third filter connected to the first filter and the second filter. The third filter blend the first signal and the second signal into a third signal; and transmit the third signal to a flight controller configured to adjust an orientation of the satellite, a satellite subsystem, or both, relative to a target in response to the third signal.

20 Claims, 3 Drawing Sheets

(58) Field of Classification Search
CPC ...... H04B 17/21; H04B 17/15; H04B 1/1036; H04B 15/00; H04B 17/11; H04B 17/29; H04B 7/18517; H04W 64/00; H04W 84/18; H04W 4/025; H04W 4/023; G01S 5/0294; G01S 7/497; G01S 19/24; G01S 19/42; B64G 1/00; B64G 1/22; G05B 23/00; G05B 23/0294; G05B 23/0221; G05B 13/04; G05B 23/0256; G05B 13/048; G05B 13/045; G05B 23/02; G05B 13/00
USPC .................. 455/12.1, 286, 306, 307, 296
See application file for complete search history.

(56) References Cited

U.S. PATENT DOCUMENTS

| | | | | |
|---|---|---|---|---|
| 9,376,221 | B1* | 6/2016 | Liu | B64G 1/22 |
| 11,073,622 | B2* | 7/2021 | Cohen | G01S 19/42 |
| 11,621,769 | B2* | 4/2023 | Wild | H04B 7/18515 |
| | | | | 455/12.1 |
| 11,677,460 | B2* | 6/2023 | Gedmark | H04B 7/18504 |
| | | | | 455/12.1 |
| 2011/0304502 | A1* | 12/2011 | Chen | H04B 7/1851 |
| | | | | 455/12.1 |
| 2016/0241327 | A1* | 8/2016 | Liu | H04B 7/18515 |
| | | | | 455/12.1 |
| 2018/0376392 | A1* | 12/2018 | Wu | H04B 7/18591 |
| 2020/0119811 | A1* | 4/2020 | Kay | H04B 7/18504 |
| 2022/0189318 | A1* | 6/2022 | Turalba | B64G 1/00 |
| 2023/0091821 | A1* | 3/2023 | Smoot | H04B 7/18517 |
| | | | | 455/12.1 |

OTHER PUBLICATIONS

Juricek, Ben C., et al., "Reduced-Rank ARX and Subspace System Identification for Process Control", IFAC Dynamics and Control of Process Systems, Corfu, Greece, 1998.

Or, et al., "Performance Evaluation of a Precision Pointing Payload", 2002.

Wicker, Josef, et al., "Low Cost Spacecraft Disturbance Rejection via Sensor Matching for Off-Gimbal Precision Pointing System", American Institute of Aeronautics and Astronauts, Inc., 2003.

* cited by examiner

SATELLITE ORIENTATION SYSTEM

STATEMENT OF GOVERNMENT INTEREST

This invention was made with government support under Contract No. FA8802-19-C-0001 awarded by the Department of the Air Force. The government has certain rights in the invention.

FIELD

The present invention relates generally to orienting and positioning of satellites, and in particular to a new and useful system for orienting a satellite in orbit.

BACKGROUND

Generally, satellite imaging systems often need to meet stringent requirements for precise boresight-to-target knowledge as well as pointing accuracy. Some payloads require inertial pointing of their line-of-sight (LOS) to within an arcsec or less with extremely low jitter and smear. In typical orientation control systems there are two primary functions: following targeting and tracking commands, and stabilization of image line of sight in the presence of base disturbances due to bus motion and actuator modes. Typical configurations include an inertial reference unit (IRU) mounted off-gimbal, which needs bandwidth matching to gimbal encoders to achieve optimal performance. In addition, disturbance rejection bandwidth is limited by the lowest bandwidth in the feedback loop (i.e. the minimum bandwidth of the IRU and the controller).

One technical problem often encountered in typical systems is that the IRUs do not offer sufficient bandwidth, since IRUs are typically designed to measure inertial angles, but not high frequency jitter motion. In contrast, gimbal encoders and LOS controllers can achieve much higher bandwidths. This mismatch limits the LOS disturbance rejection to the IRU bandwidth, and often requires passive isolation mechanisms such as D-struts to roll off high frequency disturbances at the expense of increasing payload size, weight, and power consumption of the satellite system.

Accordingly, a new approach to ensuring proper match between sensor and controller bandwidths without negatively affecting the size, weight, and power requirements of a satellite may be beneficial.

SUMMARY

Certain embodiments of the present invention may provide solutions to the problems and needs in the art that have not yet been fully identified, appreciated, or solved by current satellite systems, and in particular an embodiment of the present invention can include a satellite system including a first sensor including or defining a first measurement bandwidth; a first filter connected to the first sensor; a second sensor including or defining a second measurement bandwidth; a second filter connected to the second sensor; and a third filter connected to the first filter and the second filter.

In one embodiment of the system, the third filter can be configured to receive a first signal from the first filter including or defining a first bandwidth range; receive a second signal from the second filter including or defining a second bandwidth range; blend the first signal and the second signal into a third signal; and transmit the third signal to a flight controller configured to adjust an orientation of the satellite, a satellite subsystem, or both, relative to a target in response to the third signal.

In another embodiment of the system, the first sensor can include a Coriolis vibratory gyro.

In another embodiment of the system, first bandwidth measurement includes or defines a range between DC and 100 Hz.

In another embodiment of the system, the second sensor includes a magneto-hydro dynamometer.

In another embodiment of the system, the second bandwidth measurement includes or defines a range between 3 and 1000 Hz.

In another embodiment of the system, the first filter includes a lowpass filter configured to suppress high frequency noise from the first sensor.

In another embodiment of the system, the second filter includes a high pass filter configured to suppress low frequency noise from the second sensor.

In another embodiment of the system, the third filter includes a 13-state H-infinity filter.

In yet another embodiment, the system can further include an actuator connected to the flight controller and configured to orient the satellite, or a gimbaled mirror that adjusts the line of sight of a space imaging system, or both, in response to a command from the flight controller.

Another embodiment of the present invention can include a satellite orientation system including an actuator configured to orient the satellite, or a space imaging system that includes a mirror to adjust line of sight, or both; and a noise filter including: a first filter connected to a first sensor; a second filter connected to a second sensor; and a third filter connected to the first filter and the second filter.

In another embodiment, the third filter can be configured to receive a first signal from the first filter including or defining a first bandwidth range; receive a second signal from the second filter including or defining a second bandwidth range; and blend the first signal and the second signal into a third signal.

In another embodiment, the satellite orientation system can further include a flight controller connected to the noise filter and the actuator. In another embodiment, the flight controller can be configured to command the actuator to adjust an orientation of the satellite, or steer the mirror of a space imaging system, or both, relative to a target in response to the third signal.

In another embodiment, the first sensor can include a Coriolis vibratory gyro including or defining a first bandwidth measurement.

In another embodiment, the first bandwidth measurement includes or defines a range between DC and 100 Hz.

In another embodiment, the first filter can include a lowpass filter configured to suppress high frequency noise from the first sensor.

In another embodiment, the second sensor includes a magneto-hydro dynamometer including or defining a second bandwidth measurement.

In another embodiment, the second bandwidth measurement includes or defines a range between 3 and 1000 Hz.

In another embodiment, the second filter can include a high pass filter configured to suppress low frequency noise from the second sensor.

In yet another embodiment, the third sensor includes an H-infinity filter.

Another embodiment of the present invention can include a satellite orientation system that includes an actuator configured to orient the satellite, or a space imaging system that includes a mirror to adjust line of sight, or both; a Coriolis vibratory gyro including or defining a first measurement bandwidth; a first filter connected to the Coriolis vibratory gyro; a magneto-hydro dynamometer including or defining a second measurement bandwidth; a second filter connected to the magneto-hydro dynamometer; and an H-infinity bypass filter connected to the first filter and the second filter.

In another embodiment, the H-infinity bypass filter can be configured to receive a first signal from the first filter including or defining a first bandwidth range; receive a second signal from the second filter including or defining a second bandwidth range; and blend the first signal and the second signal into a third signal.

Another embodiment of the present invention can include a satellite orientation system that includes a flight controller connected to the H-infinity bypass filter and the actuator.

In another embodiment, the flight controller can be configured to command the actuator to adjust an orientation of the satellite, or the line of sight of a space imaging system, or both, relative to a target in response to the third signal.

In another embodiment, the first bandwidth measurement includes or defines a range between DC and 100 Hz; and the second bandwidth measurement includes or defines a range between 3 and 1000 Hz.

In yet another embodiment, the first filter includes a lowpass filter configured to suppress high frequency noise from the Coriolis vibratory gyro; and the second filter includes a high pass filter configured to suppress low frequency noise from the magneto-hydro dynamometer.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Generally, embodiments of the present invention include a dual-sensor, two-stage blended filter system that cooperates between a chassis of a satellite (or a subsystem or instrument arranged with the satellite), a satellite flight controller, and/or an actuator that is configured to orient the chassis of the satellite in a highly accurate manner, and/or a pointing mechanism for stabilizing and steering an imaging system's line of sight As described in detail below, embodiments of the system can be configured to blend signals two inertial angular sensors of different bandwidth for space imaging and broadband disturbance rejection applications. Further, embodiments of the system can include a two-stage blending filter architecture, which effectively mitigates variations in sensor characteristics and produces a highly uniform and accurate output. Example embodiments demonstrated sensor blending achieving an overall bandwidth of 500 Hz with passband ripples less than 0.2 dB, which permits the flight controller and/or actuator to point and/or orient the satellite consistently and accurately along its target orientation for spacecraft attitude control, image stabilization, line-of-sight pointing control, and high-bandwidth disturbance rejection.

1. Satellite Orientation System

Figure 1:
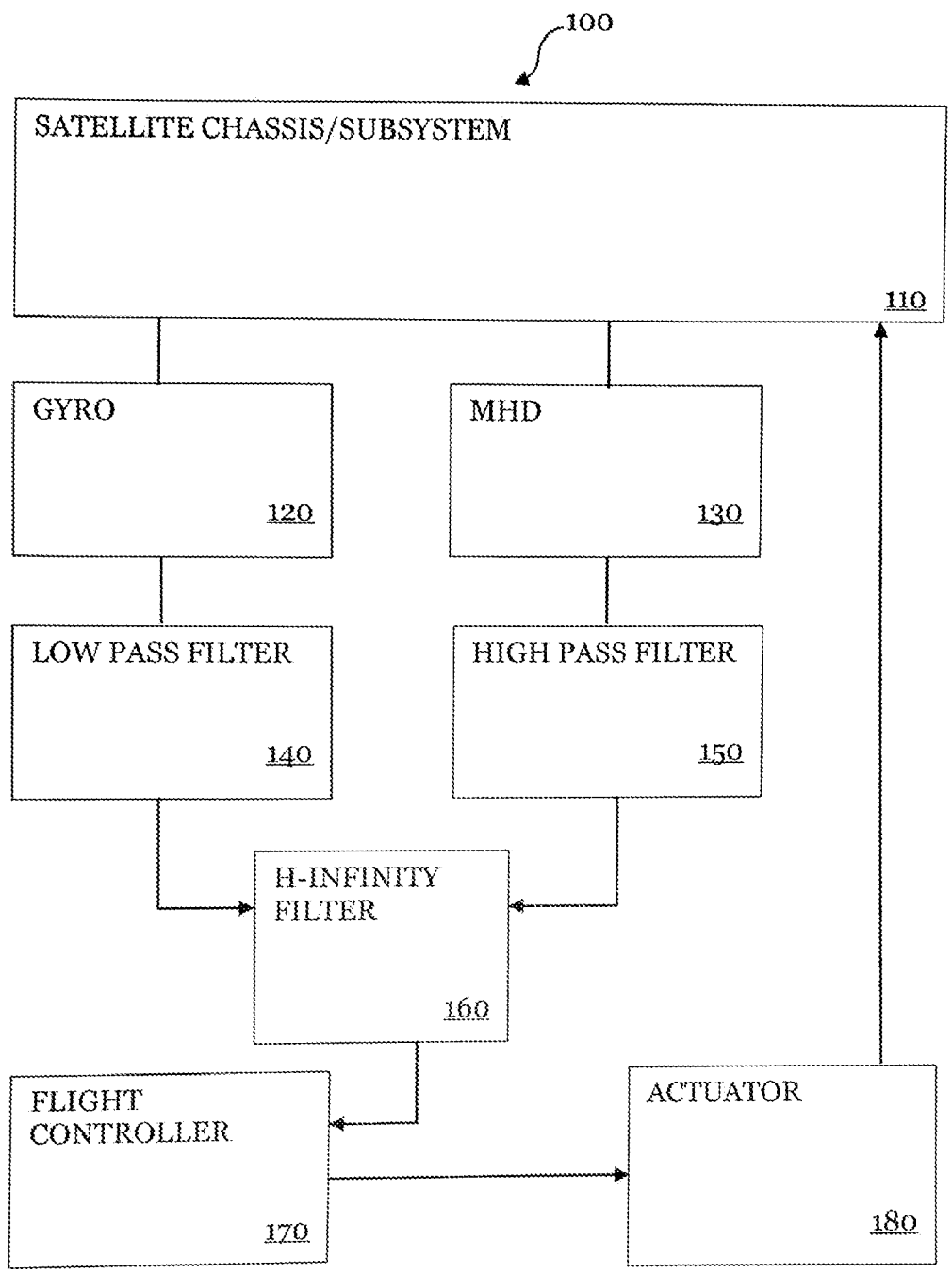
FIG. 1 is a schematic block diagram of a satellite orientation system in accordance with an embodiment of the present invention.

As shown in FIG. 1, one embodiment of a system 100 can include a first sensor 120 defining or producing a first measurement bandwidth indicative of a disturbance or jitter in the satellite chassis 110. As used herein, the satellite chassis 110 can include a body of a satellite or space vehicle or a portion thereof. For example, the satellite chassis 110 can be understood to include the satellite, a subsystem thereof, or both. Example subsystems can include a payload or set of payloads arranged with or attached to a satellite body, including for example a camera, detector, or other instrument for which accurate pointing and orientation is desirable.

In some embodiments, the first sensor 120 can function to detect a vibration, mechanical disturbance, and/or jitter in the satellite chassis 110 during operation and to produce a first measurement indicative of the frequency of the vibration, mechanical disturbance, and/or jitter. In one variation of the embodiments, the first sensor 120 can be mechanically, optically, or opto-mechanically coupled to the satellite chassis 110 such that the first sensor 120 can detect the aforementioned vibration, mechanical disturbance, and/or jitter.

In another variation of the embodiments, the first sensor 120 can include a Coriolis vibratory gyro (CVG). In another variation of the embodiments, the first bandwidth measurement can include or define a range of bandwidths between approximately zero and 10 Hz. Alternatively, the first bandwidth measurement can include a range of bandwidths between approximately zero and 100 Hz. In another alternative, the first bandwidth measurement can include a range of bandwidths between approximately zero and in excess of 100 Hz.

In another variation of the embodiments, the first sensor 120 can include a dyad or triad of gyroscopes arranged at one or more locations in, on, or about the satellite chassis 110. In another variation of the embodiments, the first bandwidth measurement for one or more of the CVGs can include a range of bandwidths between approximately zero and 100 Hz. Alternatively, the first bandwidth measurement for one or more of the CVGs can include a range of bandwidths between approximately zero and in excess of 100 Hz.

As shown in FIG. 1, in another variation of the embodiments, the system 100 can include a first filter 140 connected to the first sensor 120. The first filter 140 can be configured as a part of a first stage of signal filtering. Furthermore, the first filter 140 can function to suppress, limit, and/or exclude high frequency jitter, or noise in the signal coming from the first sensor 120. In one variation of the embodiments, the first filter 140 can include a low pass filter that is configured to suppress, limit, and/or exclude high frequency noise from the first sensor 120, which as noted above can include a CVG.

In variations of the embodiments in which the system 100 includes more than one first sensor 120, the first filter 140 can be connected to each of the more than one first sensors 120. Alternatively, in variations of the embodiments in which the system 100 includes more than one first sensor 120, the system 100 can also include more than one first filter 140 connected to one of the first sensors 120 or a subset of the more than one first sensors 120.

As shown in FIG. 1, embodiments of the system 100 can also include a second sensor 130 defining or producing a first measurement bandwidth indicative of a disturbance or jitter in the satellite chassis 110. The second sensor 130 can function to detect a vibration, mechanical disturbance, and/or jitter in the satellite chassis 110 during operation and to produce a second measurement indicative of the frequency of the vibration, mechanical disturbance, and/or jitter. In one variation of the embodiments, the second sensor 130 can be mechanically, optically, or opto-mechanically coupled to the satellite chassis 110 such that the second sensor 130 can detect the aforementioned vibration, mechanical disturbance, and/or jitter.

In variations of the embodiments, the second sensor 130 can include a magneto-hydro dynamometer (MHD). In another variation of the embodiments, the second bandwidth measurement can include or define a range between 3 Hz and 100 Hz. Alternatively, the second bandwidth measurement can include a range of bandwidths between approximately 3 Hz and in excess of 1000 Hz.

In another variation of the embodiments, the second sensor 130 can include a dyad or triad of MHDs arranged at one or more locations in, on, or about the satellite chassis 110. In another variation of the embodiments, the second bandwidth measurement for one or more of the MHDs can include a range of bandwidths between approximately 3 Hz and 1000 Hz. Alternatively, the second bandwidth measurement for the one or more of the MHDs can include a range of bandwidths between approximately 3 Hz and in excess of 1000 Hz.

As shown in FIG. 1, in another variation of the embodiments, the system 100 can include a second filter 150 connected to the second sensor 130. The second filter 150 can be configured as a part of a first stage of signal filtering. Furthermore, the second filter 150 can function to suppress, limit, and/or exclude low frequency drift, or noise in the signal coming from the second sensor 130. In one variation of the embodiments, the second filter 150 can include a high pass filter that is configured to suppress, limit, and/or exclude low frequency noise or drift from the second sensor 130, which as noted above can include a MHD.

In variations of the embodiments in which the system 100 includes more than one second sensor 130, the second filter 150 can be connected to each of the more than one second sensors 130. Alternatively, in variations of the embodiments in which the system 100 includes more than one second sensor 130, the system 100 can also include more than one second filter 150 connected to one of the second sensors 130 or a subset of the more than one second sensors 130.

As shown in FIG. 1, embodiments of the system 100 can also include a third filter 160 connected to the first filter 140 and the second filter 150. Generally, the third filter 160 can function to receive, ingest, and/or combine the filtered signals from the first filter 140 and the second filter 150 and generate, compute, and/or transmit a second-state filtered signal that benefits from both original signals detected by the first sensor 120 and the second sensor 130. In particular, the third filter 160 can include a second stage of a two-stage signal filtering architecture that is configured to invert any nonuniformities received from the first stage (e.g., first and second filters 130, 150) of the two-stage filtering architecture.

In embodiments of the system 100, the third filter 160 can be configured to receive a first signal from the first filter 130 including a first bandwidth range; receive a second signal from the second filter 150 including a second bandwidth range; blend the first signal and the second signal into a third signal; and transmit the third signal to a flight controller 170 configured to adjust an orientation of the satellite relative to a target in response to the third signal.

As shown in FIG. 1, embodiments of the system 100 can also include an actuator 180 connected to the flight controller 170 and configured to orient the satellite, the satellite chassis 110, and/or a portion of the satellite system (e.g., a payload specific portion of the satellite) in a desired orientation for spacecraft attitude control, image stabilization, line-of-sight pointing control, and high-bandwidth disturbance rejection.

In another variation of the system 100, the third filter 160 can include an H-infinity filter. Alternatively, the third filter 160 can include a 13-stage H-infinity filter that is configured and/or configurable to invert the nonuniformities in a summed transfer function after the first filter 130 and the second filter 150 (e.g., the first filtering stage). In other variations of the embodiments, the system 100 can include a set of third filters 160 (e.g., a set of H-infinity filters) connected to sets or subsets of first filters 130 and second filters 150 in a multi-channel, two-stage filtering architecture.

In embodiments of the system 100, the third filter 160 can be designed, shaped, and/or optimized according to a H-infinity control problem including a 17-state autoregressive exogenous model including a least-square system ID method to generate an 8-state space model. Generally, the optimal H-infinity shaping filter can be defined recursively. In one embodiment of the system 100, a formulation of the H-infinity loop-shaping problem on hand and the respective weighting strategy is shown in FIG. 2, where K(s) is the H-infinity shaping filter 160 and T(s) is the sensor dynamics including the first stage filters 130, 150.

Figure 2:
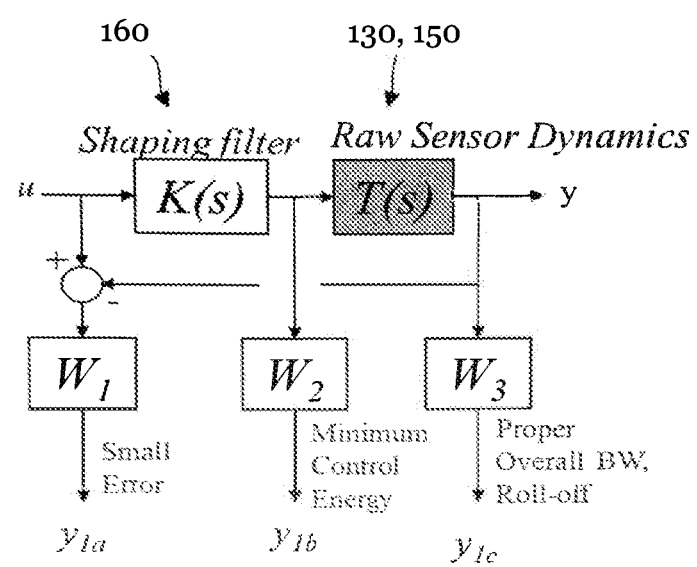
FIG. 2 is a schematic control diagram of a loop-shaping problem and weighting strategy for a second stage filter in accordance with an embodiment of the present invention.

FIG. 2 can also be illustrated by the following cost function:

$$\begin{bmatrix} y_{1a} \\ y_{1b} \\ y_{1c} \\ y_2 \end{bmatrix} = \begin{bmatrix} W_1 & -W_1 G \\ 0 & W_2 \\ 0 & W_3 G \\ I & 0 \end{bmatrix} \begin{bmatrix} u_1 \\ u_2 \end{bmatrix}$$

$$\min_{F(s)} \|T_{y1u1}\|_\infty = \left\| \begin{bmatrix} W_1 S \\ W_2 KS \\ W_3 T \end{bmatrix} \right\|_\infty \leq 1$$

Where the function $W_1$ penalizes input and output errors, the function $W_2$ minimizes shaping filter output energy, and the function $W_3$ establishes the desired bandwidth to which the overall blended transfer function converges. Generally, the cost function and control algorithm implemented in the third filter 160 ensure that the final loop-shape converges to the set of predefined weighting functions and therefore shapes the desired blending response.

Figure 3A:
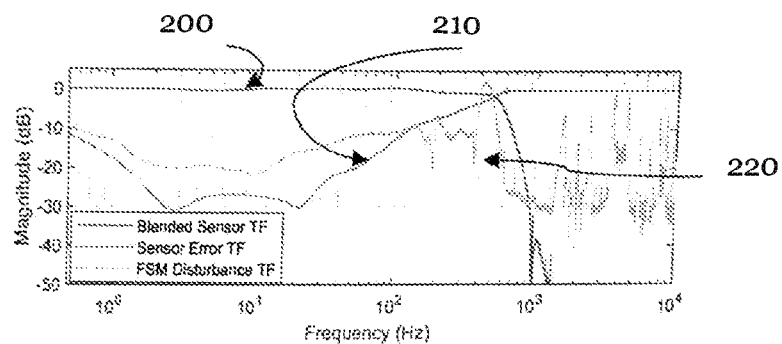
FIGS. 3A and 3B are graphical representations of a frequency response of a two stage filter in accordance with an embodiment of the present invention.
Figure 3B:
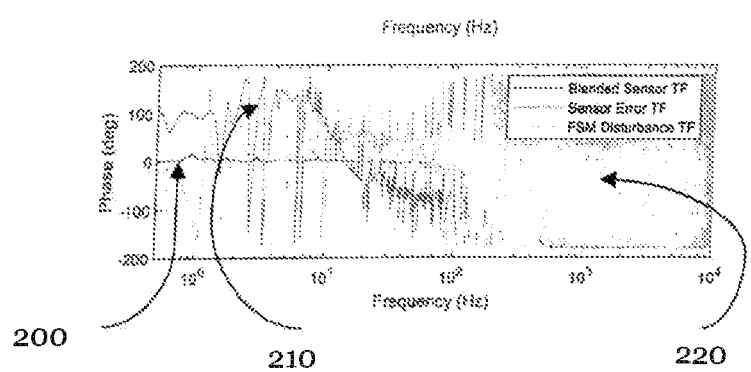

As shown in FIGS. 3A and 3B, an example design of the third filter 160 as described above generates a highly uniform output with a designed 3-dB bandwidth of 500 Hz and pass band ripple less than 0.2 dB. FIGS. 3A and 3B illustrate the blended transfer function 200, the sensor error transfer function 210, and the disturbance rejection 220 based upon feedback from the third filter 160. FIG. 3A shows the foregoing relationship as a function of frequency and magnitude, and FIG. 3B shows the foregoing relationship as a function of frequency and phase.

As shown in FIG. 1, in embodiments of the system 100, the third filter 160 generates the third signal, for example the disturbance rejection signal using a fast steering mirror (FSM) shown in FIGS. 3A and 3B, and transmits the third signal the flight controller 170. In embodiments of the system 100, the flight controller 170 can receive the third signal and in response thereto, generate and transmit a control signal to the actuator 180 to mechanically, optically, electromechanically, or electromagnetically alter or adjust an orientation or positioning of the satellite chassis 110 and/or a portion or payload of the satellite system.

Each of the filters described herein 130, 150, 160 and the flight controller 170 can be configured as modules defined by software, firmware, and/or hardware components or subsystems. Generally, a module can be implemented as a hardware circuit comprising custom very large scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices, graphics processing units, or the like.

A module can also be at least partially implemented in software for execution by various types of processors. An identified unit of executable code can, for instance, include one or more physical or logical blocks of computer instructions that can, for instance, be organized as an object, procedure, or function. Nevertheless, the executables of an identified module need not be physically located together, but can include disparate instructions stored in different locations that, when joined logically together, comprise the module and achieve the stated purpose for the module. Further, modules can be stored on a computer-readable medium, which can be, for instance, a hard disk drive, flash device, RAM, tape, and/or any other such non-transitory computer-readable medium used to store data without deviating from the scope of the invention.

Indeed, a module of executable code could be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network.

The various modules can execute one or more methods performed by a computer program, encoding instructions for the processor(s) to perform at least part of the process(es), techniques, or methods described herein, in accordance with embodiments of the claimed invention. The computer program can be embodied on a non-transitory computer-readable medium. The computer-readable medium can be, but is not limited to, a hard disk drive, a flash device, RAM, a tape, and/or any other such medium or combination of media used to store data. The computer program can include encoded instructions for controlling the processor(s) of a computer system (e.g., the first filter 130, the second filter 150, the third filter 160, the flight controller 170) to implement all or part of the process steps described in herein, which can also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A satellite system comprising:
a first angle sensor comprising a first measurement bandwidth;
a first filter connected to the first sensor;
a second angle sensor comprising a second measurement bandwidth;
a second filter connected to the second sensor;
a third filter connected to the first filter and the second filter, the third filter configured to:
receive a first signal from the first filter comprising a first bandwidth range;
receive a second signal from the second filter comprising a second bandwidth range;
blend the first signal and the second signal into a third signal; and
transmit the third signal to a flight controller configured to adjust an orientation of the satellite, a satellite subsystem, or both, relative to a target in response to the third signal.

2. The satellite system of claim 1, wherein the first sensor comprises a Coriolis vibratory gyro.

3. The satellite system of claim 2, wherein the first measurement bandwidth comprises a range between DC and a first high frequency value.

4. The satellite system of claim 3, wherein the second sensor comprises a magneto-hydro dynamometer.

5. The satellite system of claim 4, wherein the second measurement bandwidth comprises a range comprising a second high frequency value greater than the first high frequency value.

6. The satellite system of claim 5, wherein the first filter comprises a lowpass filter configured to suppress high frequency noise from the first sensor.

7. The satellite system of claim 6, wherein the second filter comprises a high pass filter configured to suppress low frequency noise from the second sensor.

8. The satellite system of claim 7, wherein the third filter comprises an H-infinity filter.

9. The satellite system of claim 1, further comprising an actuator connected to the flight controller and configured to orient the satellite, the satellite subsystem, or both, in response to a command from the flight controller.

10. A satellite orientation system comprising:
an actuator configured to orient the satellite, a satellite subsystem, or both;
a blending filter comprising:
a first filter connected to a first sensor;
a second filter connected to a second sensor;
a third filter connected to the first filter and the second filter, the third filter configured to:
receive a first signal from the first filter comprising a first bandwidth range;
receive a second signal from the second filter comprising a second bandwidth range;
blend the first signal and the second signal into a third signal; and
a flight controller connected to the blending filter and the actuator, the flight controller configured to command the actuator to adjust an orientation of the satellite, a satellite subsystem, or both, relative to a target in response to the third signal.

11. The system of claim 10, further comprising a first sensor comprising a Coriolis vibratory gyro comprising a first measurement bandwidth.

12. The system of claim 11, wherein the first measurement bandwidth comprises a range between DC and a first high frequency value.

13. The system of claim 12, wherein the first filter comprises a lowpass filter configured to suppress high frequency noise from the first sensor.

14. The system of claim 10, wherein the second sensor comprises a magneto-hydro dynamometer comprising a second measurement bandwidth.

15. The system of claim 14, wherein the second measurement bandwidth comprises a range comprising a second high frequency value greater than the first high frequency value.

16. The system of claim 15, wherein the second filter comprises a high pass filter configured to suppress low frequency noise from the second sensor.

17. The system of claim 10, wherein the third filter comprises an H-infinity filter.

18. A satellite orientation system comprising:
an actuator configured to orient the satellite, a satellite subsystem, or both;
a Coriolis vibratory gyro comprising a first measurement bandwidth;
a first filter connected to the Coriolis vibratory gyro;
a magneto-hydro dynamometer comprising a second measurement bandwidth;
a second filter connected to the magneto-hydro dynamometer;
an H-infinity blending filter connected to the first filter and the second filter, configured to:
receive a first signal from the first filter comprising a first bandwidth range;
receive a second signal from the second filter comprising a second bandwidth range;
blend the first signal and the second signal into a third signal; and
a flight controller connected to the H-infinity blending filter and the actuator, the flight controller configured to command the actuator to adjust an orientation of the satellite, a satellite subsystem, or both, relative to a target in response to the third signal.

19. The system of claim 18, wherein:
the first measurement bandwidth measurement comprises a first bandwidth range between DC and a first high frequency value; and
the second bandwidth measurement comprises a range comprising a second high frequency value greater than the first high frequency value.

20. The system of claim 18, wherein:
the first filter comprises a lowpass filter configured to suppress high frequency noise from the Coriolis vibratory gyro; and
the second filter comprises a high pass filter configured to suppress low frequency noise from the magneto-hydro dynamometer.

* * * * *